(12) United States Patent
Hosoya et al.

(10) Patent No.: US 11,091,623 B2
(45) Date of Patent: Aug. 17, 2021

(54) CYCLIC OLEFIN-BASED RESIN COMPOSITION FILM

(71) Applicant: DEXERIALS CORPORATION, Tokyo (JP)

(72) Inventors: Ken Hosoya, Kawachi-gun (JP); Akihiro Horii, Shimotsuke (JP); Kei Obata, Shimotsuke (JP); Taku Ishimori, Shimotsuke (JP); Kazuki Hirata, Shimotsuke (JP); Hiroshi Sugata, Tagajo (JP)

(73) Assignee: DEXERIALS CORPORATION, Tokyo (JP)

( * ) Notice: Subject to any disclaimer, the term of this patent is extended or adjusted under 35 U.S.C. 154(b) by 0 days.

(21) Appl. No.: 15/758,568

(22) PCT Filed: Nov. 18, 2015

(86) PCT No.: PCT/JP2015/082396
§ 371 (c)(1),
(2) Date: Mar. 8, 2018

(87) PCT Pub. No.: WO2017/085808
PCT Pub. Date: May 26, 2017

(65) Prior Publication Data
US 2018/0258273 A1   Sep. 13, 2018

(51) Int. Cl.
| | | |
|---|---|---|
| *C08L 45/00* | (2006.01) | |
| *B29C 48/08* | (2019.01) | |
| *B29C 48/00* | (2019.01) | |
| *C08J 5/18* | (2006.01) | |
| *G02B 5/02* | (2006.01) | |
| *G02B 1/118* | (2015.01) | |
| *C08K 3/20* | (2006.01) | |
| *G02B 1/14* | (2015.01) | |
| *G02B 1/08* | (2006.01) | |
| *G02B 1/111* | (2015.01) | |
| *G02B 5/30* | (2006.01) | |
| *G06F 3/045* | (2006.01) | |
| *B29K 23/00* | (2006.01) | |
| *B29K 509/02* | (2006.01) | |
| *B29L 31/34* | (2006.01) | |
| *G02F 1/1333* | (2006.01) | |

(52) U.S. Cl.
CPC .......... *C08L 45/00* (2013.01); *B29C 48/022* (2019.02); *B29C 48/08* (2019.02); *C08J 5/18* (2013.01); *C08K 3/20* (2013.01); *G02B 1/08* (2013.01); *G02B 1/111* (2013.01); *G02B 1/118* (2013.01); *G02B 1/14* (2015.01); *G02B 5/0242* (2013.01); *G02B 5/0278* (2013.01); *G02B 5/0294* (2013.01); *G02B 5/3083* (2013.01); *G06F 3/045* (2013.01); *B29K 2023/38* (2013.01); *B29K 2509/02* (2013.01); *B29K 2995/0005* (2013.01); *B29K 2995/0026* (2013.01); *B29K 2995/0077* (2013.01); *B29L 2031/34* (2013.01); *C08J 2345/00* (2013.01); *C08J 2453/00* (2013.01); *C08L 2203/16* (2013.01); *G02F 1/13338* (2013.01)

(58) Field of Classification Search
CPC ...... G02B 5/3083; G02B 5/0294; G02B 1/08; G02B 1/14; G02B 1/111; G02B 5/0278; G02B 5/0242; C08J 5/18; C08L 45/00; G06F 3/045
USPC .......................................................... 524/413
See application file for complete search history.

(56) References Cited

U.S. PATENT DOCUMENTS

| | | | | |
|---|---|---|---|---|
| 2003/0174994 A1* | 9/2003 | Garito | .................... | B82Y 20/00 385/129 |
| 2006/0020075 A1* | 1/2006 | Basham | ...................... | C08J 5/18 524/494 |
| 2010/0181107 A1* | 7/2010 | Yamamoto | .............. | H01F 1/344 174/378 |
| 2015/0259485 A1* | 9/2015 | Kunimoto | ............... | C08L 35/06 525/241 |
| 2016/0187544 A1 | 6/2016 | Watanabe et al. | | |
| 2016/0311987 A1 | 10/2016 | Hosoya et al. | | |

FOREIGN PATENT DOCUMENTS

| | | | |
|---|---|---|---|
| JP | 2002-069210 A | | 3/2002 |
| JP | 2003-105214 A | | 4/2003 |
| JP | 2004-156048 A | | 6/2004 |
| JP | 2008-286859 A | | 11/2008 |
| JP | 2015-055796 A | | 3/2015 |
| WO | WO 2014 034200 | * | 3/2014 |
| WO | 2015/083808 A1 | | 6/2015 |
| WO | 2015/178279 A1 | | 11/2015 |

OTHER PUBLICATIONS

Technical data sheet of TOPAS 6017S-04, 2019 (Year: 2019).*
Feb. 9, 2016 International Search Report issued in International Patent Application No. PCT/JP2015/082396.
May 22, 2018 International Preliminary Report on Patentability issued in International Patent Application No. PCT/JP2015/082396.

* cited by examiner

*Primary Examiner* — Doris L Lee
(74) *Attorney, Agent, or Firm* — Oliff PLC

(57) ABSTRACT

A cyclic olefin resin composition film having high toughness with less difference in toughness between length and width directions. The cyclic olefin resin composition film contains a cyclic olefin resin, a styrene elastomer and inorganic oxide fine particles having an average particle diameter of 40 nm or smaller, and has a linear expansion coefficient of 40 ppm/° C. to 60 ppm/° C. This film attains high toughness with less difference in toughness between length and width directions.

20 Claims, 6 Drawing Sheets

CYCLIC OLEFIN-BASED RESIN COMPOSITION FILM

FIELD OF THE INVENTION

The present invention relates to a cyclic olefin resin composition film in which an elastomer and the like are added and dispersed into a cyclic olefin resin.

BACKGROUND ART

A cyclic olefin resin is an amorphous thermoplastic olefin resin that has a cyclic olefin skeleton in its main chain and exhibits excellent performance such as good optical properties (transparency and low birefringence), low water absorbency, dimensional stability and high moisture resistance resulting therefrom, and the like. Accordingly, films or sheets of cyclic olefin resins are expected to be useful for various optical applications including phase difference films, polarizer protection films and light diffusion plates, and for various moisture-proof packaging applications including medicinal product packages and food packages.

Since a film of cyclic olefin resin is low in toughness, there is known a technique to improve the toughness of a cyclic olefin resin film by the addition and dispersion of an elastomer with hard and soft segments etc. into the cyclic olefin resin (see, for example, Patent Literature 1).

However, the cyclic olefin resin film into which the elastomer is added and dispersed is equivalent to a common amorphous plastic material and is high in linear expansion efficient so that, when the cyclic olefin resin film is bonded to an inorganic material such as glass, there occurs a curl or internal strain in the cyclic olefin resin film with changes in temperature. Further, the cyclic olefin resin film has a large difference in toughness between length direction (MD: Machine Direction) and width direction (TD: Transverse Direction) due to orientation of the elastomer.

CITATION LIST

Patent Literature

Patent Literature 1: Japanese Laid-Open Patent Publication No. 2004-156048

SUMMARY OF THE INVENTION

Problems to be Solved by the Invention

The present invention has been made in view of the above conventional circumstances. It is an object of the present invention to provide a cyclic olefin resin composition film having high toughness with less difference in toughness between length and width directions.

Means for Solving the Problem

The present inventors have found that, when a cyclic olefin resin composition film is produced by mixing a cyclic olefin resin with a styrene elastomer and inorganic oxide fine particles of predetermined average particle diameter and controlling the linear expansion coefficient of the film to within a predetermined range, it is possible to impart high toughness to the cyclic olefin resin composition film with less difference in toughness between length and width directions. The present invention is based on this finding.

Namely, there is provided according to one aspect of the present invention a cyclic olefin resin composition film, comprising: a cyclic olefin resin; a styrene elastomer; and inorganic oxide fine particles having an average particle diameter of 40 nm or smaller, the cyclic olefin resin composition film having a linear expansion coefficient of 40 ppm/° C. to 60 ppm/° C.

There is provided according to another aspect of the present invention a method for producing a cyclic olefin resin composition film, comprising: melting a cyclic olefin resin together with a styrene elastomer and inorganic oxide fine particles having an average particle diameter of 40 nm or smaller, thereby yielding a molten cyclic olefin resin composition; and extruding the molten cyclic olefin resin composition into a film shape, the cyclic olefin resin composition film having a linear expansion coefficient of 40 ppm/° C. to 60 ppm/° C.

The cyclic olefin resin composition film according to the present invention is suitable for use in a transparent conductive element, an input device, a display device and an electronic apparatus.

Effect of the Invention

In the present invention, it is possible to impart high toughness to the cyclic olefin resin composition film with less difference in toughness between length and width directions.

DESCRIPTION OF EMBODIMENTS

Embodiments of the present invention will be described below in the following order with reference to the drawings
1. Cyclic olefin resin composition film
2. Production method of cyclic olefin resin composition film
3. Applications to electronic apparatuses
4. Examples ⟨1. Cyclic Olefin Resin Composition Film⟩

A cyclic olefin resin composition film according to the present embodiment contains a cyclic olefin resin, a styrene elastomer and fine particles of inorganic oxide having an average particle diameter of 40 nm or smaller, and has a linear expansion coefficient of 40 ppm/° C. to 60 ppm/° C.

Herein, the term "linear expansion coefficient" refers to the rate of change in the length of an object by expansion or contraction with changes in temperature and can be expressed by the amount of distortion per unit temperature. The linear expansion coefficient is determined according to JIS K 7197 as an average linear expansion coefficient α (ppm/° C.) of a test sample at a temperature of T1 to T2 by the following formula:

$$\alpha = \Delta L / L0 \times (T2 - T1)$$

where α is the linear expansion coefficient; ΔL is the difference between the length of the test sample at T2 and the length of the test sample at T1; and L0 is the length of the test sample at T1.

Figure 1:
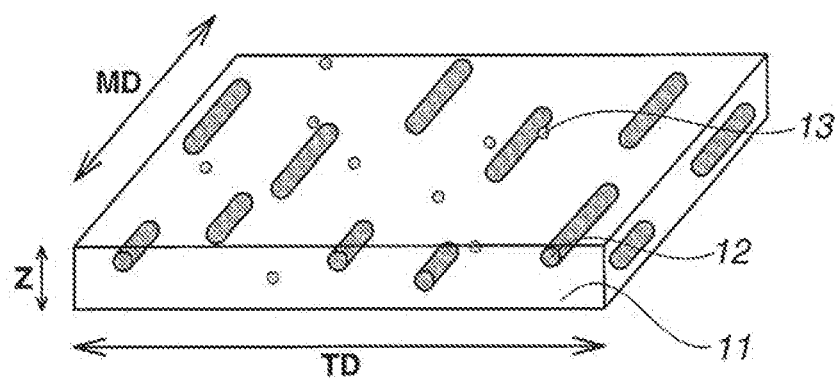
FIG. 1 is a schematic perspective cross-sectional view of a cyclic olefin resin composition film according to one embodiment of the present invention.

FIG. 1 is a perspective sectional view of the cyclic olefin resin composition film according to the present embodiment. As shown in FIG. 1, the cyclic olefin resin composition film contains a cyclic olefin resin 11, a styrene elastomer 12 and inorganic oxide fine particles 13.

The cyclic olefin resin composition film is in the form of, for example, a rectangular film or sheet having a width direction (TD: Transverse Direction) as the X-axis direction, a length direction (MD: Machine Direction) as the Y-axis direction and a thickness direction as the Z-axis direction. The thickness X of the cyclic olefin resin composition film is preferably 0.1 μm to 2 mm, more preferably 1 μm to 1 mm.

Further, the cyclic olefin resin composition film has a structure in which a dispersion phase (island phase) of the styrene elastomer 12 is dispersed in a matrix (sea phase) of the cyclic olefin resin 11 as shown in FIG. 1. The dispersion phase is dispersed by e.g. extrusion molding so as to exhibit shape anisotropy in the MD and have a major axis in the MD and a minor axis in the TD.

The minor-axis dispersion diameter of the styrene elastomer 12 is generally 2 μm or smaller, preferably 1 μm or smaller. When the minor-axis dispersion diameter of the styrene elastomer is too large, there occurs clearance between the styrene elastomer and the cyclic olefin resin due to phase change of the styrene elastomer during environmental storage so that the refractive index of the styrene elastomer itself becomes changed to cause a large change in the haze of the film.

Herein, the term "minor-axis dispersion diameter" refers to the size of the dispersion phase of the styrene elastomer 12 in the TD and can be determined as follows. First, the cyclic olefin resin composition film is cut to expose a TD-thickness (Z-axis) cross section. The cross section of the film is then observed with magnification. The minor axis of each dispersion phase within a prescribed range in the center of the film cross section is measured. The average of the measured minor-axis length value is defined as the minor-axis dispersion diameter. In the case where the dispersion diameter is small, it is preferable to cut the film after treatment of the film by osmium staining.

The linear expansion coefficient of the cyclic olefin resin composition film is in the range of 40 ppm/° C. to 60 ppm/° C. In the present embodiment, the inorganic oxide fine particles with an average particle diameter of 40 nm or smaller is contained in the cyclic olefin resin composition film. It is possible by the addition of such inorganic oxide fine particles to suppress not only vibrations of the cyclic olefin resin but also orientation of the styrene elastomer in the MD, TD and thereby decrease a difference in linear expansion coefficient between the MD and TD.

The tensile modulus of the cyclic olefin resin composition film is preferably 1500 MPa to 2000 MPa. A cyclic olefin resin composition film consisting of cyclic olefin resin 11 and styrene elastomer 12 shows a tensile modulus of 1800 to 2200 MPa. By the addition of the inorganic oxide fine particles 13, the cyclic olefin resin composition film becomes lowered in tensile modulus but maintains tear strength. In the present embodiment, the inorganic oxide fine particles having an average particle diameter of 40 nm or smaller is contained in the cyclic olefin resin composition film. It is possible by the addition of such inorganic oxide fine particles to suppress orientation of the styrene elastomer in the MD, TD and thereby decrease a difference in tensile modulus between the MD and TD as in the case of the linear expansion coefficient.

Next, the cyclic olefin resin 11, the styrene elastomer 12 and the inorganic oxide fine particles 13 will be explained below in more detail.

[Cyclic Olefin Resin]

The cyclic olefin resin is a polymer compound whose main chain is composed of carbon-carbon bonds and has a cyclic hydrocarbon structure in at least a part of the main chain. The cyclic hydrocarbon structure is introduced with the use of a cyclic hydrocarbon compound having at least one olefinic double bond (cyclic olefin) as typified by norbornene and tetracyclododecene, as a monomer.

The cyclic olefin resin can be classified as: (1) an addition (co)polymer of a cyclic olefin, or a hydrogenated product thereof; (2) an addition copolymer of a cyclic olefin and an α-olefin, or a hydrogenated product thereof; or (3) a ring-opening (co)polymer of a cyclic olefin, or a hydrogenated product thereof.

Specific examples of the cyclic olefin are: monocyclic olefins such as cyclopentene, cyclohexene, cyclooctene, cyclopentadiene, and 1,3-cyclohexadiene; bicyclic olefins such as bicyclo[2.2.1]hept-2-ene (common name: norbornene), 5-methyl-bicyclo[2.2.1]hept-2-ene, 5,5-dimethyl-bicyclo[2.2.1]hept-2-ene, 5-ethyl-bicyclo[2.2.1]hept-2-ene, 5-butyl-bicyclo[2.2.1]hept-2-ene, 5-ethylidene-bicyclo[2.2.1]hept-2-ene, 5-hexyl-bicyclo[2.2.1]hept-2-ene, 5-octyl-bicyclo[2.2.1]hept-2-ene, 5-octadecyl-bicyclo[2.2.1]hept-2-ene, 5-methylidene-bicyclo[2.2.1]hept-2-ene, 5-vinyl-bicyclo[2.2.1]hept-2-ene, and 5-propenyl-bicyclo[2.2.1]hept-2-ene;

tricyclic olefins such as tricyclo[4.3.0.1$^{2,5}$]deca-3,7-diene (common name: dicyclopentadiene), tricyclo[4.3.0.1$^{2,5}$]dec-3-ene, tricyclo[4.4.0.1$^{2,5}$]undeca-3,7-diene or tricyclo[4.4.0.1$^{2,5}$]undeca-3,8-diene, or a partially hydrogenated product (or addition product of cyclopentadiene and cyclohexane) thereof, that is, tricyclo[4.4.0.1$^{2,5}$]undec-3-ene, 5-cyclopentyl-bicyclo[2.2.1]hept-2-ene, 5-cyclohexyl-bicyclo[2.2.1]hept-2-ene, 5-cyclohexenyl-bicyclo[2.2.1]hept-2-ene, and 5-phenyl-bicyclo[2.2.1]hept-2-ene;

tetracyclic olefins such as tetracyclo[4.4.0.1$^{2,5}$.1$^{7,10}$]dodec-3-ene (also simply referred to as tetracyclododecene), 8-methyl-tetracyclo[4.4.0.1$^{2,5}$.1$^{7,10}$]dodec-3-ene, 8-ethyl-tetracyclo[4.4.0.1$^{2,5}$.1$^{7,10}$]dodec-3-ene, 8-methylidene-tetracyclo[4.4.0.1$^{2,5}$.1$^{7,10}$]dodec-3-ene, 8-ethylidene-tetracyclo[4.4.0.1$^{2,5}$.1$^{7,10}$]dodec-3-ene, 8-vinyl-tetracyclo[4.4.0.1$^{2,5}$.1$^{7,10}$]dodec-3-ene, and 8-propenyl-tetracyclo[4.4.0.1$^{2,5}$.1$^{7,10}$]dodec-3-ene; and polycyclic olefins such as 8-cyclopentyl-tetracyclo[4.4.0.1$^{2,5}$.1$^{7,10}$]dodec-3-ene, 8-cyclohexyl-tetracyclo

[4.4.0.1$^{2,5}$.1$^{7,10}$]dodec-3-ene, 8-cyclohexenyl-tetracyclo[4.4.0.1$^{2,5}$.1$^{7,10}$]dodec-3-ene, 8-phenyl-cyclopentyl-tetracyclo[4.4.0.1$^{2,5}$.1$^{7,10}$]dodec-3-ene, tetracyclo[7.4.0.1$^{3,6}$.0$^{1,9}$.0$^{2,7}$]tetradeca-4,9,11,13-tetraene (also referred to as 1,4-methano-1,4,4a,9a-tetrahydrofluorene), tetracyclo[8.4.0.1$^{4,7}$.0$^{1,10}$.0$^{3,8}$]pentadeca-5,10,12,14-tetraene (also referred to as 1,4-methano-1,4,4a,5,10,10a-hexahydroanthracene), pentacyclo[6.6.1.1$^{3,6}$.0$^{2,7}$.0$^{9,14}$]-4-hexadecene, pentacyclo[6.5.1.1$^{3,6}$.0$^{2,7}$.0$^{9,13}$]-4-pentadecene, pentacyclo[7.4.0.0$^{2,7}$.1$^{3,6}$.1$^{10,13}$]-4-pentadecene, heptacyclo[8.7.0.1$^{2,9}$.1$^{4,7}$.1$^{11,17}$.0$^{3,8}$.0$^{12,16}$]-5-eicosene, heptacyclo[8.7.0.1$^{2,9}$.0$^{3,8}$.1$^{4,7}$.1$^{12,17}$.1$^{13,16}$]-14-eicosene, and a tetramer of cyclopentadiene. These cyclic olefins can be used solely or in combination of two or more kinds thereof.

Specific examples of the α-olefin copolymerizable with the cyclic olefin are α-olefins of 2 to 20 carbon atoms, preferably α-olefins of 2 to 8 carbon atoms, such as ethylene, propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-denene, 1-dodecene, 1-tetradecene, 1-hexadecene, 1-octadecene, and 1-eicosene. These α-olefins can be used solely or in combination of two or more kinds thereof. The amount of the α-olefin(s) used is in the range of 5 to 200 mol % relative to the amount of the cyclic polyolefin.

There are no particular limitations on the process of polymerization of the cyclic olefin or polymerization of the cyclic olefin and the α-olefin and the process of hydrogenation of the resulting polymer. The polymerization and the hydrogenation can be performed by know processes.

In the present embodiment, an addition copolymer of ethylene and norbornene is preferably used as the cyclic olefin resin.

There is no particular limitation on the structure of the cyclic olefin resin. Although the cyclic olefin resin can have linear structure, a branched structure or a cross-linked structure, it is preferable that the cyclic olefin resin has a linear structure.

The number-average molecular weight of the cyclic olefin resin as determined by GPC method is generally 5000 to 300000, preferably 10000 to 150000, more preferably 15000 to 100000. When the number-average molecular weight ox the cyclic olefin resin is too small, the mechanical strength of the film may be deteriorated. The formability of the film may be lowered when the number-average molecular weight of the cyclic olefin resin is too large.

The cyclic olefin resin may be: (4) a graft polymer or copolymer in which an unsaturated compound (u) having a polar group (such as carboxyl group, acid anhydride group, epoxy group, amide group, ester group or hydroxy group) is incorporated in any of the aforementioned cyclic olefin resins (1) to (3). The cyclic olefin resins (1) to (4) can be used in the form of a mixture of two or mote kinds thereof.

Examples of the unsaturated compound (u) are (meth)acrylic acid, maleic acid, maleic acid anhydride, itaconic acid anhydride, glycidyl (meth)acrylate, (meth)acrylic acid alkyl ($C_1$-$C_{10}$) ester, maleic acid alkyl ($C_1$-$C_{10}$) ester, (meth)acrylamide and 2-hydroxyethyl (meth)acrylate.

The use of the modified cyclic olefin resin (4), in which the polar group-containing unsaturated compound (u) is introduced by graft polymerization or copolymerization, leads to an increase in compatibility with a metal material or polar resin material so as to allow an improvement in strength by various secondary processing such as deposition, sputtering, coating, bonding etc. Thus, the modified cyclic olefin resin (4) is suitable for use in the case where secondary processing is required. There is however a drawback in which the water absorbency of the cyclic olefin resin is increased in the presence of the polar group. For this reason, the content of the polar group (such as carboxyl group, acid anhydride group, epoxy group, amide group, ester group or hydroxyl group) is preferably 0 to 1 mol/kg per 1 kg of the cyclic olefin resin.

[Styrene Elastomer]

The styrene elastomer is a copolymer of styrene and a conjugated diene such as butadiene or isoprene, and/or a hydrogenated product thereof. More specifically, the styrene elastomer is a block copolymer containing a hard segment of styrene and a soft segment of conjugated diene. The storage modulus of the styrene elastomer changes in accordance with the structure of the soft segment. The refractive index of the styrene elastomer changes in accordance with the content of the hard segment, which causes a change in the haze of the film as a whole. The styrene elastomer is suitably used since it does not require vulcanization. A hydrogenated product of the styrene elastomer is more suitably used because of its high thermal stability.

Examples of the styrene elastomer are styrene/butadiene/styrene block copolymers, styrene/isoprene/styrene block copolymers, styrene/ethylene/butylene/styrene block copolymers, styrene/ethylene/propylene/styrene block copolymers and styrene/butadiene block copolymers.

As the styrene elastomer, there can also be used any of a styrene/ethylene/butylene/styrene block copolymer, a styrene/ethylene/propylene/styrene block copolymer and a styrene/butadiene block copolymer, in each of which the double bond of the conjugated diene component is eliminated by hydrogenation (also referred to as hydrogenated styrene elastomer).

There is no particular limitation on the structure of the styrene elastomer. Although the styrene elastomer can have a linear structure, a branched structure or a cross-linked structure, it is preferable that the styrene elastomer has a linear structure in order to decrease the storage modulus.

In the present embodiment, at least one kind selected from the group consisting of styrene/ethylene/butylene/styrene block copolymers, styrene/ethylene/propylene/styrene block copolymers and hydrogenated styrene/butadiene copolymers is preferably used as the styrene elastomer. In particular, a hydrogenated styrene/butadiene copolymer is more preferably used because of its high tear strength and less increase in haze after environmental storage. In order to avoid impairing compatibility between the hydrogenated styrene/butadiene copolymer and the cyclic olefin, the butadiene-to-styrene ratio of the hydrogenated styrene/butadiene copolymer is preferably in the range of 10 to 90 mol %.

The styrene content of the styrene elastomer is preferably 10 mol % or more, more preferably 20 mol % or more, still more preferably 30 mol % or more. The higher the stylene content, the higher the tear strength of the film, the lower the initial haze of the film.

Further, the number-average molecular weight of the styrene elastomer as determined by GPC method is generally 5000 to 300000, preferably 10000 to 150000, more preferably 20000 to 100000. When the number-average molecular weight of the styrene elastomer is too small, the mechanical strength of the film may be deteriorated. The formability of the film may be lowered when the number-average molecular weight of the styrene elastomer is too large.

The addition amount of the styrene elastomer is preferably 5 vol % to 30 vol %. When the addition amount of the styrene elastomer is too large, the environmental storage stability of the film may be deteriorated. The film may be not formed with sufficient toughness when the addition amount of the styrene elastomer is too small.

[Inorganic Oxide Fine Particles]

The inorganic oxide fine parades are preferably particles of at least one kind of oxide selected from $Al_2O_3$, $SiO_2$, $ZrO_2$ and $TiO_2$. These inorganic oxide fine particles have a small linear expansion coefficient. It is possible by the addition of such inorganic oxide fine particles to decrease the linear expansion coefficient of the cyclic olefin resin composition film.

The upper limit of the addition amount of the inorganic oxide fine particles is preferably less than 30 vol %, more preferably 20 vol % or less. The lower limit of the addition amount of the inorganic oxide fine particles is preferably 0.1 vol % or more, more preferably 1.0 vol % or more, still more preferably 10 vol % or more. When the addition amount of the inorganic oxide fine particles is too large, the optical properties (haze and retardation) of the film may be deteriorated. When the addition amount of the inorganic oxide fine particles is too small, it becomes difficult to decrease the difference in linear expansion coefficient between the MD and TD.

The average particle diameter of the inorganic oxide fine particles is preferably 40 nm or smaller, more preferably 15 nm or smaller, still more preferably 2 nm to 10 nm. When the average particle diameter of the inorganic oxide fine particles is too large, the film sheet may be whitened due to scattering of light and thereby may not obtain desired transparency. When the average particle diameter of the inorganic oxide fine particles is too small, it is substantially difficult to add the inorganic oxide fine particles. Herein, the term "average particle diameter" can be determined as follows. The sum of the major- and minor-axis lengths of each particle (in the case where the particles are plate-shaped, the lengths of the particles in the plate surface direction and the plate thickness direction) is divided by 2. The average of the calculated values ((major-axis length+minor-axis length)/2) of 100 particles is defined as the average particle diameter.

The inorganic oxide fine particles can be prepared by a vapor phase method or a liquid phase method. In the vapor phase method, a dry powder is directly obtained with relatively good dispersibility. The vapor phase method, except chemical flame method, is however not suitable for industrial production because of low mass productivity and high cost. In the liquid phase method, a powder is obtained by forming and growing crystal nuclei through a chemical reaction in a solution, and then, drying and firing the resulting particles. In order to prepare fine particles by the liquid phase method, the preparation conditions need to be strictly controlled so as not to allow the growth of the particles in the respective steps. Further, it is of most importance in the liquid phase method to suppress agglomeration of the particles because, when the particles are agglomerated during the drying, large energy needs to be applied for dispersion of those particles. In some cases, the particles in liquid phase may be directly subjected to the dispersion step without the drying and firing steps.

[Other Additives]

The cyclic olefin resin composition optionally contains, in addition to the cyclic olefin resin, styrene elastomer and inorganic oxide fine particles, any additive(s) as needed within the range that does not impair the properties of the cyclic olefin resin composition. Various additives common to thermoplastic resin materials can be used without particular limitation. Examples of the additive(s) are an antioxidant, an ultraviolet absorber, a light stabilizer, a plasticizer, a lubricant, an antistatic agent, a frame retardant, a coloring agent e.g. dye or pigment, a near-infrared absorber, a fluorescent brightening agent, a compounding agent, a filler and the like.

The thus-obtained cyclic olefin resin composition film attains an in-plane retardation $R_0$ of 10 nm or smaller, a tear strength of 60 N/mm or higher and a haze of 1.0% or lower. When the tear strength of the film is lower than the above range, the film is unfavorably likely to be broken during production or use. When the haze of the film is too high, the properties of the film deviate from the initial settings and cannot be obtained as desired.

⟨2. Production Method of Cyclic Olefin Resin Composition Film⟩

A production method of a cyclic olefin resin composition film according to the present embodiment includes melting a cyclic olefin resin together with a styrene elastomer and inorganic oxide fine particles, and then, extruding the resulting molten cyclic olefin resin composition into a film shape, wherein the cyclic olefin resin composition film has a linear expansion coefficient of 40 ppm/° C. to 60 ppm/° C. The cyclic olefin resin composition film can be unstretched, uniaxially stretched or biaxially stretched.

Figure 2:
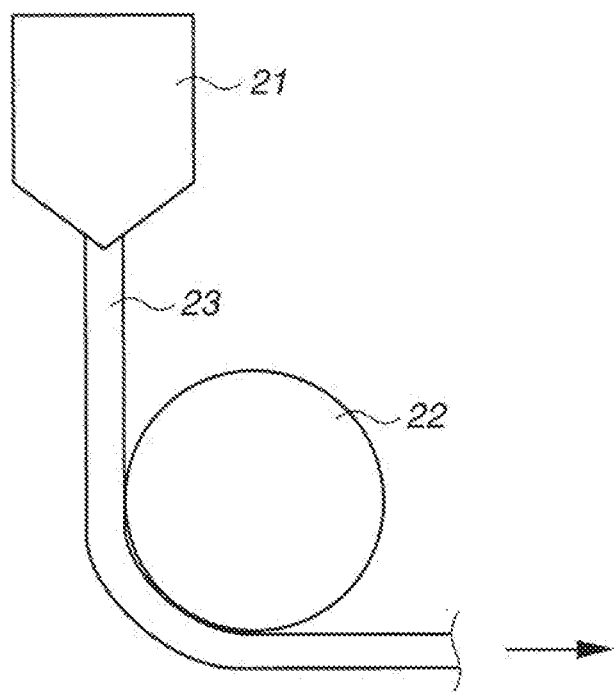
FIG. 2 is a schematic view showing a configuration example of a film production device.

FIG. 2 is a schematic view showing an example of a film production device. The film production device includes a die 21 and a roll 22. The die 21 is in the form of a melt molding die that extrudes a molten resin material 23 into a film shape. The molten resin material 23 contains the above-mentioned cyclic olefin resin composition. The roll 22 is adapted to transfer the resin material 23 extruded in the film shape from the die 21. Further, the roll 22 has formed therein a flow path for a fluid and has the function of adjusting its surface temperature to a given degree by means of a separate temperature controller. There is no particular limitation on the material for the surface of the roll 22. The surface of the roll 22 can be of a metal, rubber, resin or elastomer.

In the present embodiment, the cyclic olefin resin composition in which the above-mentioned cyclic olefin resin and styrene elastomer are contained is used as the resin material 23 and subjected to melt mixing within the temperature range of 210 to 300° C. There is a tendency that the higher the melting temperature, the smaller the minor-axis dispersion diameter of the styrene elastomer.

⟨3. Applications to Electronic Apparatuses⟩

The cyclic olefin resin composition film according to the present embodiment can be used for various optical applications such as a phase difference film, a polarizer protective film, a light diffusion plate and, in particular, to a prism sheet and a liquid crystal cell substrate.

The following explanation will be given of the application of the cyclic olefin resin composition film to a phase difference film.

Figure 3:
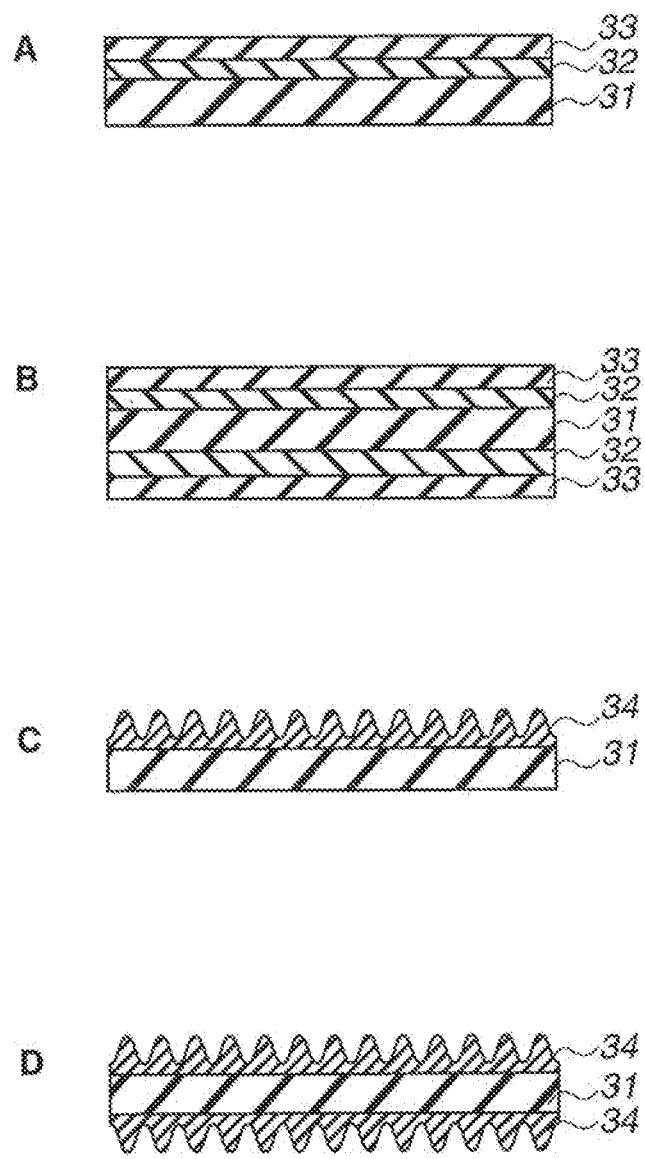
FIGS. 3A and 3B are cross-sectional views showing examples of transparent conductive films.
FIGS. 3C and 3D are cross-sectional views showing examples of transparent conductive films with moth-eye structures.

FIGS. 3A and 3B are cross-sectional views showing examples of transparent conductive films. Each of the transparent conductive films (transparent conductive elements) includes the above-mentioned cyclic olefin resin composition film as a base film (substrate). More specifically, the transparent conductive film has a phase difference film 31 arranged as the base film (substrate) and a transparent conductive layer 33 arranged on at least one surface of the phase difference film 31. FIG. 3A shows one example in which the transparent conductive layer 33 is arranged on one surface of the phase difference film 31, whereas FIG. 3B shows another example in which the transparent conductive layers 33 are arranged on both surfaces of the phase difference film 31. As shown in FIGS. 3A and 3B, a hard coat layer 32 may be arranged between the phase difference film 31 and the transparent conductive layer 33.

The material of the transparent conductive layer 33 is, for example, at least one kind of electrically conductive material selected from the group consisting of metal oxide material, metal material, carbon material and conductive polymer. Examples of the metal oxide material are indium tin oxide (ITO), zinc oxide, indium oxide, antimony-doped tin oxide, fluorine-doped tin oxide, aluminum-doped zinc oxide, gallium-doped zinc oxide, silicon-doped zinc oxide, zinc oxide-tin oxide, indium oxide-tin oxide and zinc oxide-indium oxide-magnesium oxide composite. The metal material can be in the form of a metal nanofiller such as metal nanoparticle or metal nanowire. Examples of the metal material are metals such as copper, silver, gold, platinum, palladium, nickel, tin, cobalt, rhodium, iridium, iron, ruthenium, osmium, manganese, molybdenum, tungsten, niobium, tantalum, titanium, bismuth, antimony and lead, and alloys thereof. Examples of the carbon material are carbon black, carbon fiber, fullerene, graphene, carbon nanotube, carbon microcoil and carbon nanohorn. Examples of the conductive polymer are substituted or unsubstituted polyaniline, substituted or unsubstituted polypyrrole, substituted or unsubstituted polythiophene, and (co)polymers of one kind or two or more kinds thereof.

It is feasible to form the transparent conductive layer 33 by, for example, PVD process such as sputtering, vacuum deposition or ion plating, CVD process, coating process or printing process. The transparent conductive layer 33 may be a transparent electrode with a predetermined electrode pattern. The electrode pattern can be provided in, but is not limited to, a strip shape.

The material of the hard coat layer 32 is preferably an ionization radiation curable resin curable by light or electron beam radiation or a thermosetting resin curable by heating. Particularly preferred is a photosensitive resin curable by ultraviolet radiation. Examples of such a photosensitive resin are acrylic resins such as urethane acrylate, epoxy acrylate, polyester acrylate, polyol acrylate, polyether acrylate and melamine acrylate. For instance, urethane acrylate is obtained by reacting a polyester polyol with an isocyanate monomer or prepolymer, and then, reacting the resulting reaction product with a hydroxyl-containing acrylic or methacrylic monomer. The thickness of the hard coat layer 32 is preferably, but is not specifically limited to, 1 μm to 20 μm.

The transparent conductive film may have a moth-eye structure 34 arranged as an anti-reflection layer on at least one surface of the phase difference film as shown in FIGS. 3C and 3D. FIG. 3C shows one example in which the moth-eye structure 34 is arranged on one surface of the phase difference film 31, whereas FIG. 3D shows another example in which the moth-eye structures 34 are arranged on both surfaces of the phase difference film. The anti-reflection layer arranged on the surface of the phase difference film 11 is not limited to the above moth-eye structure. A conventionally known anti-reflection layer such as low refractive index layer can be used as the anti-reflection layer.

Figure 4:
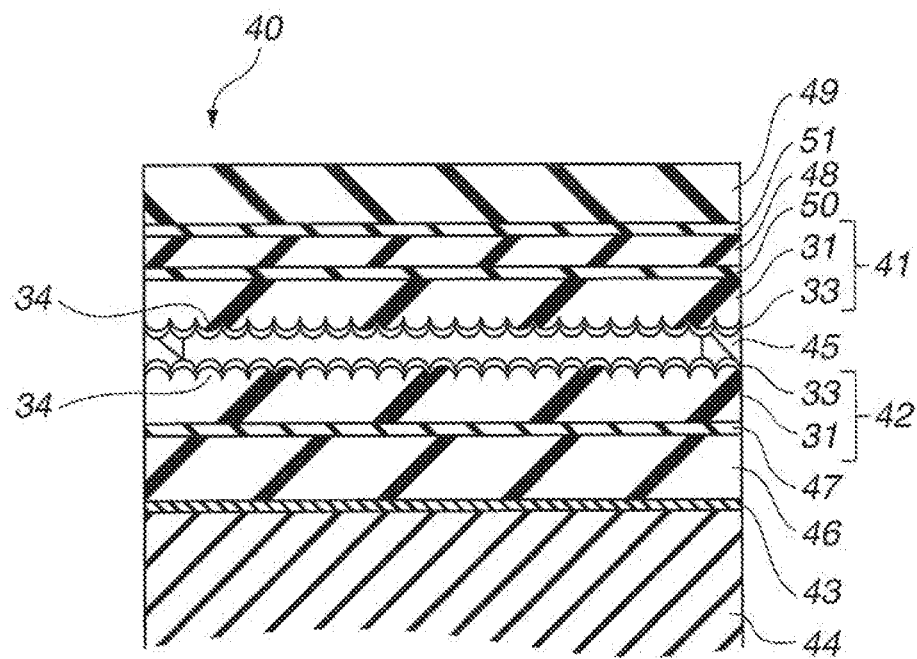
FIG. 4 is a cross-sectional view showing a configuration example of a touch panel.

FIG. 4 is a schematic sectional view showing a configuration example of a touch panel. In this example, the touch panel (input device) 40 is configured as a so-called resistive film touch panel. The resistive film touch panel can be either an analog resistive film touch panel or a digital resistive film touch panel.

The touch panel 40 has a first transparent conductive film 41 and a second transparent conductive film 42 opposed to the first transparent conductive film 41. The first and second transparent conductive films 41 and 42 are bonded together at peripheral portions thereof via a bonding part 45. An adhesive paste, adhesive tape or the like can be used as the bonding part 45. The touch panel 40 is bonded to a display device 44 via a bonding layer 43. An adhesive such as acrylic adhesive, rubber adhesive or silicon adhesive can be used as the material of the bonding layer 43. In view of the transparency, an acrylic adhesive is preferred as the material of the bonding layer 43.

The touch panel 40 also has a polarizer 48 bonded to a touch-side surface of the first transparent conductive film 41 via a bonding layer 50. The above-mentioned transparent conductive film is usable as the first transparent conductive film 41 and/or the second transparent conductive film 42. Herein, the phase difference film as the base film (substrate) is set to λ/4. The adoption of the polarizer 48 and the phase difference film 31 leads to a decrease in reflectance and improvement in visibility.

It is preferable that the touch panel 40 has moth-eye structures 34 arranged on opposing surfaces of the first and second transparent conductive films 41 and 42, that is, on respective surfaces of the transparent conductive layers 33 of these transparent conductive films. The use of such moth-eye structures leads to improvements in the optical properties (such reflection characteristics and transmission characteristics) of the first and second transparent conductive films 41 and 42.

It is preferable that the touch panel 40 has one or more anti-reflection layers arranged on the touch-side surface of the first transparent conductive film 41 to obtain a decrease in reflectance and improvement in visibility.

For improvement in scratch resistance, it is preferable that the touch panel 40 has a hard coat layer arranged on the touch-side surface of the first transparent conductive film 41. In this case, it is preferable to impart soil resistance to a surface of the hard coat layer.

It is preferable that the touch panel 40 has a front panel (surface member) 49 bonded to the touch-side surface of the first transparent conductive film 41 via a bonding layer 51. It is further preferable that the touch panel 40 has a glass substrate 46 bonded via a bonding layer 47 to the display device 44 side surface of the second transparent conductive film 42.

Furthermore, it is preferable that the touch panel 40 has a plurality of structures on the display device 44 side surface of the second transparent conductive film 42 so as to improve adhesion of the touch panel 40 and the bonding layer 53 by the anchor effect of the plurality of structures. As such structure, a moth-eye structure is preferably used to suppress interface reflection.

As the display device 44, there can be used various types of display devices such as a liquid crystal display, a CRT (Cathode Ray Tube) display, a plasma display panel (PDF), an electro luminescence (EL) display and a surface-conduction electron-emitter display (SED).

Next, an electronic apparatus with the above-mentioned input device 40 will be explained below.

Figure 5:
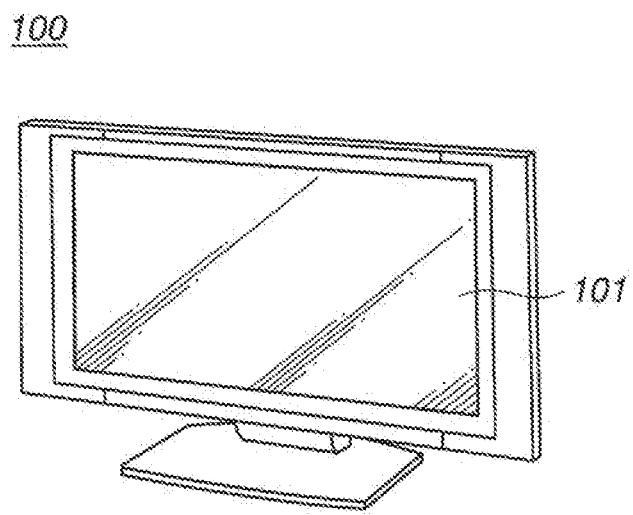
FIG. 5 is an external view of a television apparatus as an example of electronic apparatus.

FIG. 5 is an external view of a television apparatus as an example of the electronic apparatus. The television apparatus 100 has a display portion 101. The display portion 101 is provided with the touch panel 40.

Figure 6:
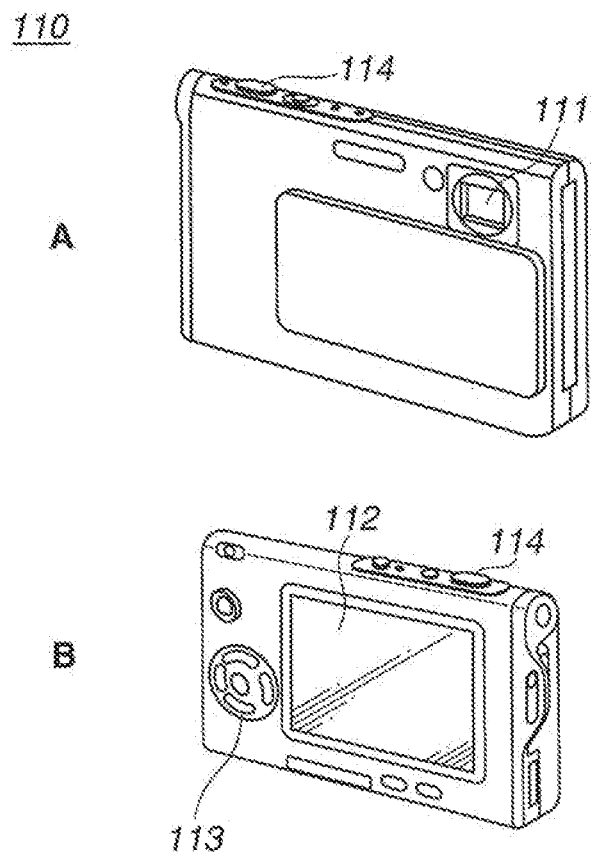
FIGS. 6A and 6B are external views of a digital camera as an example of electronic apparatus.

FIGS. 6A and 6B are external views of a digital camera as an example of the electronic apparatus. Herein, FIG. 6 is an external view of the digital camera as seen from the front side; and FIG. 6B is an external view of the digital camera as seen from the back side. The digital camera 110 has a flash light emitting portion 111, a display portion 112, a menu switch 113 and a shutter button 114. The display portion 112 is provided with the touch panel 40.

Figure 7:
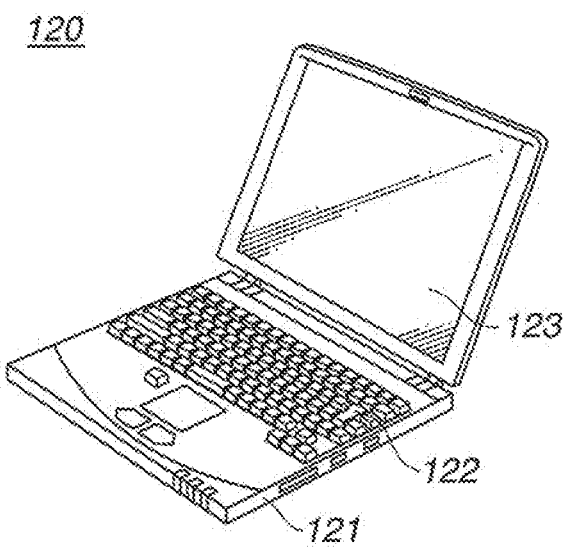
FIG. 7 is an external view of a laptop computer as an example of electronic apparatus.

FIG. 7 is an external view of a laptop computer as an example of the electronic apparatus. The laptop computer 120 has a body portion 121 including a keyboard 122 for inputting characters and a display portion 123 for displaying an image. The display portion 123 is provided with the touch panel 40.

Figure 8:
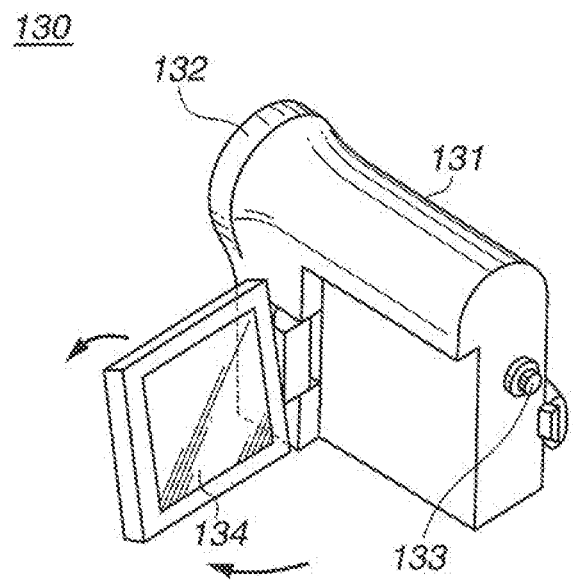
FIG. 8 is an external view of a video camera as an example of electronic apparatus.

FIG. 8 is an external view of a video camera as an example of the electronic apparatus. The video camera 130 has a body portion 131, a target-photographing lens 132 provided on a forward-facing side surface of the body portion, a photographing start/stop switch 133 and a display portion 134. The display portion 134 is provided with the touch panel 40.

Figure 9:
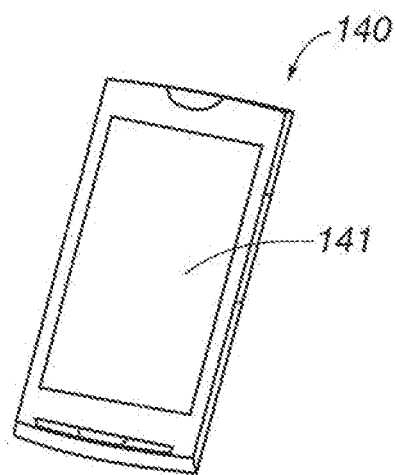
FIG. 9 is an external view of a mobile phone as an example of electronic apparatus.

FIG. 9 is an external view of a mobile phone as an example of the electronic apparatus. The mobile phone 140 is configured as a so-called smartphone having a display portion 141 provided with the touch panel 40.

Figure 10:
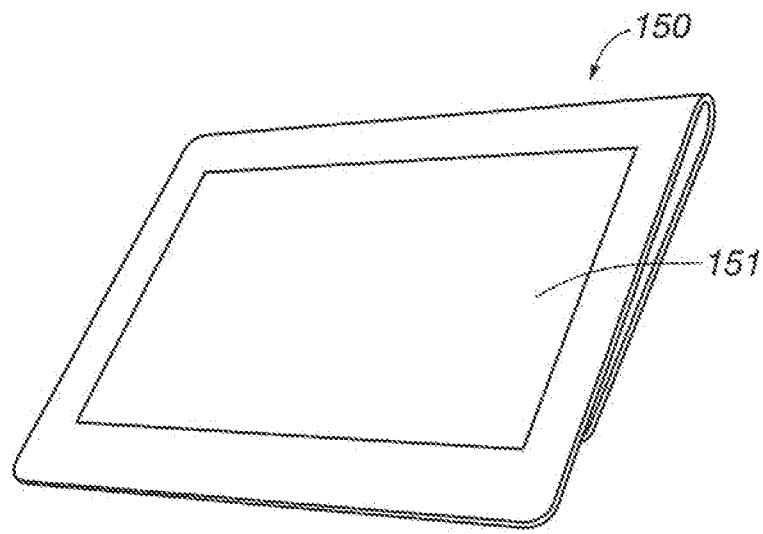
FIG. 10 is as external view of a tablet computer as an example of electronic apparatus.

FIG. 10 is an external view of a tablet computer as an example of the electronic apparatus. The tablet computer 150 has a display portion 151 provided with the touch panel 40.

The above-mentioned electronic apparatus, in which the cyclic olefin resin composition film having a small in-plane retardation and high toughness is used in the display portion, achieves high durability and high-quality image displaying.

EXAMPLES

⟨4.1 First Experiment⟩

The present invention will be described in more detail by way of the following examples. In the following examples, cyclic olefin resin composition films were each produced by mixing a cyclic olefin resin with a styrene elastomer and inorganic oxide fine particles, and then, tested for the linear expansion coefficient, tensile modulus, tear strength and initial haze. It should be noted that the following examples are not intended to limit the present invention thereto.

The linear expansion coefficient, tensile modulus, tear strength and initial haze of the respective cyclic olefin resin composition films were measured by the following methods.

[Measurement of Linear Expansion Coefficient]

Using a thermomechanical analyzer (TMA: Thermomechanical Analysis, TMA 4100 SA manufactured by NETZSCH Japan K.K.), linear expansion coefficient measurement was carried out according to JIS K 7197. A film of 0.2 to 0.3 mm thickness was cut into a size of 4×10 mm. The average linear expansion coefficient (ppm/° C.) of the resulting film sample was measured at a temperature raise rate of 2° C./min in a temperature range of 0° C. to 200° C. The average of the measured values of the linear expansion coefficient in the MD and TD was determined as the linear expansion coefficient.

[Measurement of Tensile Modulus]

The tensile modulus of a film sample as a No. 2 test specimen was measured according to JIS K 7113 at a tensile speed of 50 mm/min and at an ambient temperature (23° C.). The average of the measured values of the tensile modulus in the MD and TD was rounded to the nearest hundred.

[Measurement and Evaluation of Tear Strength (Right Angled Tear Strength)]

The tear strength of a film sample of 80 μm thickness was measured according to JIS K 7128. The film sample used was a No. 3 test specimen. The measurement test was carried out with a tensile tester (AG-X manufactured by Shimadzu Corporation) at a test speed of 200 mm/min.

The difference between the measured values of the tear strength in the MD and TD was evaluated as follows: "A" when the tear strength difference was smaller than 10 N/mm; "B" when the tear strength, difference was greater than or equal to 10 N/mm and smaller than 20 N/mm; and "C" when the tear strength difference was greater than or equal to 10 N/mm.

Further, the average of the measured values of the tear strength in the MD and TD was determined as the tear strength. The tear strength was evaluated as follows: "A" when the tear strength was higher than or equal to 80 N/mm; "B" when the tear strength was higher than or equal to 65 N/mm and lower than 80 N/mm; and "C" when the tear strength was lower than 65 N/mm. When the tear strength of a film is higher than or equal to 65 N/mm, the film has a reduced possibility of breakage during the subsequent process such as coating and thus can be put into practical use.

[Measurement and Evaluation of Initial Haze]

The initial haze of a film sample of 80 μm thickness was measured with a haze meter (HM150 manufactured by Murakami Color Research Laboratory). The initial haze was evaluated as follows: "A" when the initial haze was lower than 1.0%; "B" when the initial haze was higher than or equal to 1.0% and lower than 5.0%; and "C" when the initial haze was higher than or equal to 5.0%.

[Cyclic Olefin Resin, Styrene Elastomer and Inorganic Oxide Fine Particles]

The cyclic olefin resin used was TOPAS6013-S04 (ethylene-norbornene addition copolymer, manufactured by Polyplastics Co., Ltd.).

The styrene elastomers used were as follows:

Tuftec H1041: styrene/ethylene/butylene/styrene block copolymer, styrene content: 20 mol %, manufactured by Asahi Kasei Advance Corporation;

Tuftec H1052X: styrene/ethylene/butylene/styrene block copolymer, styrene content: 12 mol %, manufactured by Asahi Kasei Advance Corporation;

Tuftec H1062: styrene/ethylene/butylene/styrene block copolymer, styrene content: 11 mol %, manufactured by Asahi Kasei Advance Corporation;

S.O.E L606: hydrogenated styrene/butadiene block copolymer, styrene content: 36 mol %, manufactured by Asahi Kasei Advance Corporation; and S.O.E L609: hydrogenated styrene/butadiene block copolymer, styrene content: 40 mol %, manufactured by Asahi Kasei Advance Corporation.

Further, particles of $Al_2O_3$, $SiO_2$, $ZrO_2$ and $TiO_2$ were used as the inorganic oxide fine particles.

$Al_2O_3$ (aluminum oxide (γ type)): linear expansion coefficient: 7.2 ppm/° C., average particle diameter: 5 nm, manufactured by IoLiTec Co., Ltd.

$SiO_2$ (silicon oxide): linear expansion coefficient: 0.7 ppm/° C., average particle diameter: 15 nm, manufactured by IoLiTec Co., Ltd.

$ZrO_2$ (zirconium oxide): linear expansion coefficient: 10.5 ppm/° C., average particle diameter; 40 nm, manufactured by IoLiTec Co., Ltd.

$TiO_2$ (titanium oxide): linear expansion coefficient: 7.1 ppm/° C., average particle diameter: 20 nm, manufactured by Ishihara Sangyo Kaisha Ltd.

Example 1

A cyclic olefin resin composition was prepared by mixing 80 vol % of the cyclic olefin resin with 10 vol % of Tuftec H1041 as the styrene elastomer and $Al_2O_3$ particles of 5 nm average particle diameter as the inorganic oxide fine particles. Using a T-die twin-screw extruder (diameter: 25 mm, length: 26D, T-die width: 160 mm), the cyclic olefin resin composition was kneaded at a predetermined temperature within the temperature range of 210° C. to 300° C., and then, extruded at a speed of 250 g/min into a film shape of 80 μm thickness. The extruded film was wound on a roll.

As shown in TABLE 1, the linear expansion coefficient of the film was 47 ppm/° C.; and the tensile modulus of the film was 1700 MPa. The MD-TD tear strength difference of the film was evaluated as A. The tear strength of the film was 81 N/mm and was evaluated as A. The initial haze of the film was 0.5% and was evaluated as A.

Example 2

The film of 80 μm thickness was produced in the same manner as in Example 1, except that 70 vol % of the cyclic olefin resin was mixed with 10 vol % of Tuftec H1041 as the styrene elastomer and 20 vol % of $Al_2O_3$ particles of 5 nm average particle diameter as the inorganic oxide fine particles.

As shown in TABLE 1, the linear expansion coefficient of the film was 43 ppm/° C.; and the tensile modulus of the film was 1600 MPa. The MD-TD tear strength difference of the film was evaluated as A. The tear strength of the film was 72 N/mm and was evaluated as B. The initial haze of the film was 0.6% and was evaluated as A.

Example 3

The film of 80 μm thickness was produced in the same manner as in Example 1, except that 80 vol % of the cyclic olefin resin was mixed with 10 vol % of Tuftec H1041 as the styrene elastomer and 10 vol % of $SiO_2$ particles of 15 nm average particle diameter as the inorganic oxide fine particles.

As shown in TABLE 1, the linear expansion coefficient of the film was 46 ppm/° C.; and the tensile modulus of the film was 1600 MPa. The MD-TD tear strength difference of the film was evaluated as A. The tear strength of the film was 81 N/mm and was evaluated as A. The initial haze of the film was 0.5% and was evaluated as A.

Example 4

The film of 80 μm thickness was produced in the same manner as in Example 1, except that 70 vol % of the cyclic olefin resin was mixed with 10 vol % of Tuftec H1041 as the styrene elastomer and 20 vol % of $SiO_2$ particles of 15 nm average particle diameter as the inorganic oxide fine particles.

As shown in TABLE 1, the linear expansion coefficient of the film was 41 ppm/° C.; and the tensile modulus of the film was 1600 MPa. The MD-TD tear strength difference of the film was evaluated as A. The tear strength of the film was 72 N/mm and was evaluated as B. The initial haze of the film was 0.6% and was evaluated as A.

Example 5

The film of 80 μm thickness was produced in the same manner as in Example 1, except that 70 vol % of the cyclic olefin resin was mixed with 10 vol % of Tuftec H1041 as the styrene elastomer and 20 vol % of $ZrO_2$ particles of 40 nm average particle diameter as the inorganic oxide fine particles.

As shown in TABLE 1, the linear expansion coefficient of the film was 43 ppm/° C.; and the tensile modulus of the film was 1500 MPa. The MD-TD tear strength difference of the film was evaluated as A. The tear strength of the film was 72 N/mm and was evaluated as B. The initial haze of the film was 0.6% and was evaluated as A.

Example 6

The film of 80 μm thickness was produced in the same manner as in Example 1, except that 70 vol % of the cyclic olefin resin was mixed with 10 vol % of Tuftec H1041 as the styrene elastomer and 20 vol % of $TiO_2$ particles of 20 nm average particle diameter as the inorganic oxide fine particles.

As shown in TABLE 1, the linear expansion coefficient of the film was 43 ppm/° C.; and the tensile modulus of the film was 1600 MPa. The MD-TD tear strength difference of the film was evaluated as A. The tear strength of the film was 72 N/mm and was evaluated as B. The initial haze of the film was 0.6% and was evaluated as A.

Example 7

The film of 80 μm thickness was produced in the same manner as in Example 1, except that 80 vol % of the cyclic olefin resin was mixed with 10 vol % of Tuftec H1052X as the styrene elastomer and 10 vol % of $Al_2O_3$ particles of 5 nm average particle diameter as the inorganic oxide fine particles.

As shown in TABLE 1, the linear expansion coefficient of the film was 48 ppm/° C.; and the tensile modulus of the film was 1700 MPa. The MD-TD tear strength difference of the film was evaluated as A. The tear strength of the film was 77 N/mm and was evaluated as B. The initial haze of the film was 4.6% and was evaluated as B.

Example 8

The film of 80 μm thickness was produced in the same manner as in Example 1, except that 80 vol % of the cyclic olefin resin was mixed with 10 vol % of Tuftec H1062 as the styrene elastomer and 10 vol % of $Al_2O_3$ particles of 5 nm average particle diameter as the inorganic oxide fine particles.

As shown in TABLE 1, the linear expansion coefficient of the film was 48 ppm/° C.; and the tensile modulus of the film was 1700 MPa. The MD-TD tear strength difference of the film was evaluated as A. The tear strength of the film was 68 N/mm and was evaluated as B. The initial haze of the film was 3.8% and was evaluated as B.

Example 9

The film of 80 μm thickness was produced in the same manner as in Example 1, except that 80 vol % of the cyclic olefin resin was mixed with 10 vol % of S.O.E L606 as the styrene elastomer and 10 vol % of $Al_2O_3$ particles of 5 nm average particle diameter as the inorganic oxide fine particles.

As shown in TABLE 1, the linear expansion coefficient of the film was 47 ppm/° C.; and the tensile modulus of the film was 1700 MPa. The MD-TD tear strength difference of the film was evaluated as A. The tear strength of the film was 92 N/mm and was evaluated as A. The initial haze of the film was 0.5% and was evaluated as A.

Example 10

The film of 80 μm thickness was produced in the same manner as in Example 1, except that 80 vol % of the cyclic olefin resin was mixed with 10 vol % of S.O.E L609 as the styrene elastomer and 10 vol % of Al$_2$O$_3$ particles of 5 nm average particle diameter as the inorganic oxide fine particles.

As shown in TABLE 1, the linear expansion coefficient of the film was 47 ppm/° C.; and the tensile modulus of the film was 1700 MPa. The MD-TD tear strength difference of the film was evaluated as A. The tear strength of the film was 81 N/mm and was evaluated as A. The initial haze of the film was 0.5% and was evaluated as A.

Comparative Example 1

A film of 80 μm thickness was produced in the same manner as in Example 1, except that 100 vol % of the cyclic olefin resin was used as the material of the film.

As shown in TABLE 1, the linear expansion coefficient of the film was 65 ppm/° C.; and the tensile modulus of the film was 2200 MPa. The MD-TD tear strength difference of the film was evaluated as A. The tear strength of the film was 55 N/mm and was evaluated as C. The initial haze of the film was 0.2% and was evaluated as A.

Comparative Example 2

A film of 80 μm thickness was produced in the same manner as in Example 1, except that 90 vol % of the cyclic olefin resin was mixed with 10 vol % of Tuftec H1041 as the styrene elastomer.

As shown in TABLE 1, the linear expansion coefficient of the film was 62 ppm/° C.; and the tensile modulus of the film was 2000 MPa. The MD-TD tear strength difference of the film was evaluated as C. The tear strength of the film was 90 N/mm and was evaluated as A. The initial haze of the film was 0.5% and was evaluated as A.

Comparative Example 3

A film of 80 μm thickness was produced in the same manner as in Example 1, except that 60 vol % of the cyclic olefin resin was mixed with 10 vol % of Tuftec H1041 as the styrene elastomer and 30 vol % of Al$_2$O$_3$ particles of 5 nm average particle diameter as the inorganic oxide fine particles.

As shown in TABLE 1, the linear expansion coefficient of the film was 38 ppm/° C.; and the tensile modulus of the film was 1400 MPa. The MD-TD tear strength difference of the film was evaluated as A. The tear strength of the film was 63 N/mm and was evaluated as C. The initial haze of the film was 2.8% and was evaluated at B.

Comparative Example 4

A film of 80 μm thickness was produced in the same manner as in Example 1, except that 60 vol % of the cyclic olefin resin was mixed with 10 vol % of Tuftec H1041 as the styrene elastomer and 30 vol % of SiO$_2$ particles of 15 nm average particle diameter as the inorganic oxide fine particles.

As shown in TABLE 1, the linear expansion coefficient of the film was 38 ppm/° C.; and the tensile modulus of the film was 1400 MPa. The MD-TD tear strength difference of the film was evaluated as A. The tear strength of the film was 63 N/mm and was evaluated as C. The initial haze of the film was 3.4% and was evaluated as B.

Comparative Example 5

A film of 80 μm thickness was produced in the same manner as in Example 1, except that 60 vol % of the cyclic olefin resin was mixed with 10 vol % of Tuftec H1041 as the styrene elastomer and 20 vol % of SiO$_2$ particles of 100 nm average particle diameter as the inorganic oxide fine particles.

As shown in TABLE 1, the linear expansion coefficient of the film was 43 ppm/° C.; and the tensile modulus of the film was 1400 MPa. The MD-TD tear strength difference of the film was evaluated as A. The tear strength of the film was 63 N/mm and was evaluated as C. The initial haze of the film was 3.4% and was evaluated as B.

TABLE 1

| | Elastomer | | Inorganic oxide fine particles | | |
|---|---|---|---|---|---|
| | | | | Particle | |
| | Trade name | Styrene content [mol %] | Kind | diameter [nm] | [vol %] |
| Example 1 | H1041 | 20 | Al$_2$O$_3$ | 5 | 10 |
| Example 2 | H1041 | 20 | Al$_2$O$_3$ | 5 | 20 |
| Example 3 | H1041 | 20 | SiO$_2$ | 15 | 10 |
| Example 4 | H1041 | 20 | SiO$_2$ | 15 | 20 |
| Example 5 | H1041 | 20 | ZrO$_2$ | 40 | 20 |
| Example 6 | H1041 | 20 | TiO$_2$ | 20 | 20 |
| Example 7 | H1052X | 12 | Al$_2$O$_3$ | 5 | 10 |
| Example 8 | H1062 | 11 | Al$_2$O$_3$ | 5 | 10 |
| Example 9 | L606 | 36 | Al$_2$O$_3$ | 5 | 10 |
| Example 10 | L609 | 40 | Al$_2$O$_3$ | 5 | 10 |
| Comparative Example 1 | — | — | — | — | — |
| Comparative Example 2 | H1041 | 20 | — | — | — |
| Comparative Example 3 | H1041 | 20 | Al$_2$O$_3$ | 5 | 30 |
| Comparative Example 4 | H1041 | 20 | SiO$_2$ | 15 | 30 |
| Comparative Example 5 | H1041 | 20 | SiO$_2$ | 100 | 20 |

| | Linear expansion coefficient [ppm/° C.] | Tensile modulus [MPa] | Tear strength | | Initial hase [%] |
|---|---|---|---|---|---|
| | | | MD-TD difference | [N/mm] | |
| Example 1 | 47 | 1700 | A | 81 A | 0.5 A |
| Example 2 | 43 | 1600 | A | 72 B | 0.6 A |
| Example 3 | 46 | 1600 | A | 81 A | 0.5 A |
| Example 4 | 41 | 1600 | A | 72 B | 0.6 A |
| Example 5 | 43 | 1500 | A | 72 B | 0.6 A |
| Example 6 | 43 | 1600 | A | 72 B | 0.6 A |
| Example 7 | 48 | 1700 | A | 77 B | 4.6 B |
| Example 8 | 48 | 1700 | A | 68 B | 3.8 B |
| Example 9 | 47 | 1700 | A | 92 A | 0.5 A |
| Example 10 | 47 | 1700 | A | 81 A | 0.5 A |
| Comparative Example 1 | 65 | 2200 | A | 55 C | 0.2 A |
| Comparative Example 2 | 62 | 2000 | C | 90 A | 0.5 A |
| Comparative Example 3 | 38 | 1400 | A | 63 C | 2.8 B |
| Comparative Example 4 | 38 | 1400 | A | 63 C | 3.4 B |
| Comparative Example 5 | 43 | 1400 | A | 63 C | 3.4 B |

In the case where the styrene elastomer was not added as in Comparative Example 1, the tear strength of the film was lower than 65 N/mm. In the case where the inorganic oxide fine particles were not added as in Comparative Example 2, the MD-TD tear strength difference of the film was large. In the case where the film contained a large amount of the inorganic oxide fine particles and had too low a linear expansion coefficient as in Comparative Examples 2 and 3, the tear strength of the film was lower than 65 N/mm. The tear strength of the film was also lower than 65 N/mm in the case where the inorganic oxide fine particles had too large an average particle diameter as in Comparative Example 4.

On the other hand, the film achieved a tear strength of 65 N/mm or higher with less difference in tear strength between the MD and TD when the inorganic oxide fine particles of 40 nm or smaller average particle diameter was added and the linear expansion coefficient of the film was set to 40 ppm/° C. to 60 ppm/° C. as in Examples 1 to 10. Further, the film achieved a tear strength of 65 N/mm or higher with less difference in tear strength between the MD and TD when the inorganic oxide fine particles of 40 nm or smaller average partible diameter was added and g the tensile modulus of the film was set to 1500 MPa to 2000 MPa as in Examples 1 to 10.

The film achieved good tear strength and initial haze when the styrene elastomer of high styrene content was used as in Examples 1, 9 and 10.

⟨4.2 Second Experiment⟩

Figure 11:
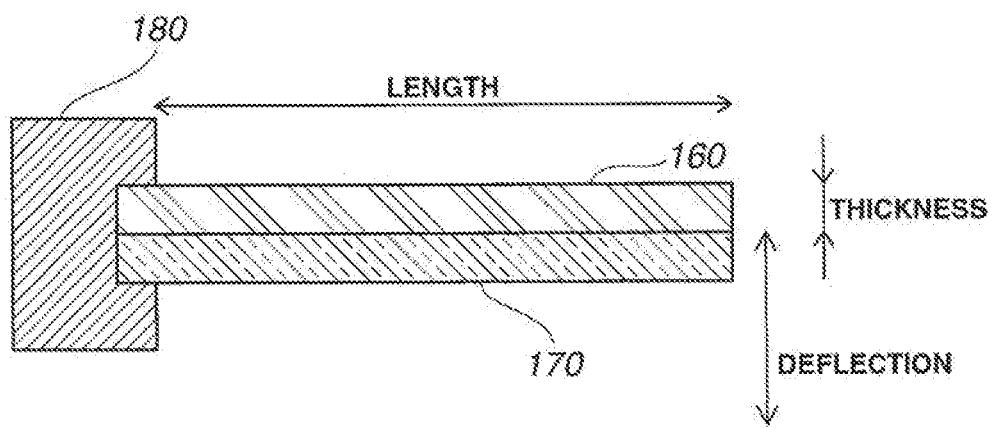
FIG. 11 is a schematic sectional view showing a method for evaluation of deflection.

Next, an experiment on "deflection" was carried out in order to verify the technical significance in decreasing the linear expansion coefficient. As shown in FIG. 11, a test sample was used in which a cyclic olefin resin composition film 160 of 80 μm thickness and a PET film 170 of 100 μm thickness (polyethylene terephthalate, linear expansion coefficient: 20 ppm/° C.) often available as an optical substrate were laminated to each other via an adhesive layer. One side of the test sample was held by a jig 180. The test sample was left for 10 minutes in a temperature atmosphere of 105° C. in a state of protruding 30 nm in the horizontal direction from the jig. After that, the amount of deflection of the test sample was measured. Herein, the influence of the own weight of the test sample was regarded as negligible; and the test sample was placed with the PET film 170 situated downward.

TABLE 2

| Cyclic olefin resin composition film Linear expansion coefficient [ppm/° C.] | PET film Linear expansion coefficient [ppm/° C.] | Deflection [mm] |
|---|---|---|
| 41 (Example 4) | 20 | 5 |
| 65 (Comparative Example 1) | 20 | 11 |

As shown in TABLE 2, the deflection amount of the test sample in the gravity direction was 11 mm in the case where the film of Comparative Example 1 was laminated as the cyclic olefin resin composition film 160. In the case where the film of Example 4 was laminated, by contrast, the deflection amount of the test sample in the gravity direction was 5 mm. In this case, there was seen some improvement of deflection characteristics. Namely, it was possible to suppress deflection by decreasing the difference in linear expansion coefficient between the cyclic olefin resin composition film 160 and the PET film 170.

DESCRIPTION OF REFERENCE NUMERALS

11: Cyclic olefin resin, 12: Styrene elastomer, 13: Inorganic oxide line particles, 21: Die, 22: Roll, 23: Resin material, 31: Phase difference film, 32: Hard coat layer, 33: Transparent conductive layer, 34: Moth-eye structure, 40: Touch panel, 41; First transparent conductive film, 42: Second transparent conductive film, 43: Bonding layer, 44: Display device, 45: Bonding part, 46: Glass substrate, 47: Bonding layer, 48: Polarizer, 49: Front panel, 50: Bonding layer, 51: Bonding layer, 100: Television apparatus, 101: Display portion, 110: Digital camera 110, 111: light emitting portion, 112: Display portion, 113: Menu switch, 114: Shutter button, 120: Laptop computer, 121: Body portion, 122: Keyboard, 123: Display portion, 130: Video camera, 131: Body portion, 132: Lens 132, 133: Start/stop switch, 134: Display portion 134, 140: Mobile phone, 141: Display portion, 150: Tablet computer, 151: Display portion; 160: Cyclic olefin resin composition film, 170: PET film, 180: Jig

The invention claimed is:

1. A cyclic olefin resin composition film comprising:
   a cyclic olefin resin;
   a styrene elastomer contained in an amount in a range of 5 vol % to 30 vol % in the cyclic olefin resin composition film; and
   fine particles of at least one kind of inorganic oxide selected from the group consisting of $Al_2O_3$, $SiO_2$, $ZrO_2$ and $TiO_2$, the fine particles having an average particle diameter of 40 nm or smaller and being contained in an amount in a range of 1.0 vol % to 20 vol % in the cyclic olefin resin composition film,
   wherein the cyclic olefin resin composition film has a linear expansion coefficient in a range of 40 ppm/° C. to 60 ppm/° C., and
   the styrene elastomer is dispersed in the cyclic olefin resin so as to exhibit shape anisotropy in a machine direction of the cyclic olefin resin composition film.

2. The cyclic olefin resin composition film according to claim 1, wherein the cyclic olefin resin composition film has a tensile modulus in a range of 1500 MPa to 2000 MPa.

3. The cyclic olefin resin composition film according to claim 1, wherein the average particle diameter of the fine particles is 15 nm or smaller.

4. The cyclic olefin resin composition film according to claim 1, wherein the cyclic olefin resin is an addition copolymer of ethylene and norbornene.

5. The cyclic olefin resin composition film according to claim 1, wherein the styrene elastomer is at least one kind selected from the group consisting of styrene/ethylene/butylene/styrene block copolymers, styrene/ethylene/propylene/styrene block copolymers, and hydrogenated styrene/butadiene copolymers.

6. The cyclic olefin resin composition film according to claim 1, wherein the fine particles are contained in an amount in a range of 10 vol % to 20 vol % in the cyclic olefin resin composition film.

7. The cyclic olefin resin composition film according to claim 1, wherein a difference in tear strength between the machine direction and a transverse direction of the cyclic olefin resin composition film is smaller than 10 N/mm.

8. The cyclic olefin resin composition film according to claim 1, wherein the cyclic olefin resin composition film has a sea-island structure in which the styrene elastomer is an island component dispersed in the cyclic olefin resin as a sea component.

9. The cyclic olefin resin composition film according to claim 1, wherein the styrene elastomer has a styrene content of 20 mol % or more.

10. The cyclic olefin resin composition film according to claim 9, wherein the styrene elastomer has a styrene content in a range of 20 mol % to 40 mass %.

11. A transparent conductive element comprising the cyclic olefin resin composition film according to claim 1 as a substrate.

12. An input device comprising the cyclic olefin resin composition film according to claim 1.

13. A display device comprising the cyclic olefin resin composition film according to claim 1.

14. An electronic apparatus comprising the cyclic olefin resin composition film according to claim 1.

15. A method for producing a cyclic olefin resin composition film, the method comprising:

melting a cyclic olefin resin together with a styrene elastomer and fine particles of at least one kind of inorganic oxide selected from the group consisting of $Al_2O_3$, $SiO_2$, $ZrO_2$ and $TiO_2$, thereby yielding a molten cyclic olefin resin composition, the styrene elastomer being contained in an amount in a range of 5 vol % to 30 vol % in the molten cyclic olefin resin composition, and the fine particles having an average particle diameter of 40 nm or smaller and being contained in an amount of 1.0 vol % to 20 vol % in the molten cyclic olefin resin composition; and extruding the molten cyclic olefin resin composition into a film shape, wherein the cyclic olefin resin composition film has a linear expansion coefficient in a range of 40 ppm/° C. to 60 ppm/° C., and the styrene elastomer is dispersed in the cyclic olefin resin so as to exhibit shape anisotropy in a machine direction of the cyclic olefin resin composition film.

16. The method according to claim 15, wherein the fine particles are contained in an amount in a range of 10 vol % to 20 vol % in the molten cyclic olefin resin composition.

17. The method according to claim 15, wherein a difference in tear strength between the machine direction and a transverse direction of the cyclic olefin resin composition film is smaller than 10 N/mm.

18. The method according to claim 15, wherein the cyclic olefin resin composition film has a sea-island structure in which the styrene elastomer is an island component dispersed in the cyclic olefin resin as a sea component.

19. The method according to claim 15, wherein the styrene elastomer has a styrene content of 20 mol % or more.

20. The method according to claim 19, wherein the styrene elastomer has a styrene content in a range of 20 mol % to 40 mass %.

* * * * *